United States Patent
Clum et al.

(10) Patent No.: US 10,641,105 B2
(45) Date of Patent: *May 5, 2020

(54) AIRFOIL HAVING FORWARD FLOWING SERPENTINE FLOW

(71) Applicant: United Technologies Corporation, Farmington, CT (US)

(72) Inventors: Carey Clum, East Hartford, CT (US); Dominic J. Mongillo, Jr., West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 235 days.

This patent is subject to a terminal disclaimer.

(21) Appl. No.: 15/671,351

(22) Filed: Aug. 8, 2017

(65) Prior Publication Data
US 2019/0048729 A1 Feb. 14, 2019

(51) Int. Cl.
*F01D 5/18* (2006.01)
*F01D 9/02* (2006.01)
(Continued)

(52) U.S. Cl.
CPC ............ *F01D 5/187* (2013.01); *F01D 5/147* (2013.01); *F01D 9/02* (2013.01); *F01D 25/12* (2013.01);
(Continued)

(58) Field of Classification Search
None
See application file for complete search history.

(56) References Cited

U.S. PATENT DOCUMENTS 5,403,159 A * 4/1995 Green ................... F01D 5/187
416/97 R
5,902,093 A * 5/1999 Liotta ................... F01D 5/20
415/115

(Continued)

FOREIGN PATENT DOCUMENTS

EP 0924385 A2 6/1999
WO 2015181488 A1 12/2015

OTHER PUBLICATIONS

European Search Report, European Application No. 18188083.2, dated Oct. 30, 2018, European Patent Office; EP Search Report 6 pages.

*Primary Examiner* — Igor Kershteyn
*Assistant Examiner* — Jason G Davis
(74) *Attorney, Agent, or Firm* — Cantor Colburn LLP

(57) ABSTRACT

Airfoils including an airfoil body having leading and trailing edges and root and tip regions, wherein an aftward direction is from the leading edge toward the trailing edge and a radially outward direction is from the root region to the tip region, a forward-flowing serpentine flow path within the airfoil body defined by a first serpentine cavity, a second serpentine cavity, and a third serpentine cavity, wherein the first serpentine cavity is aftward of the second serpentine cavity, and the second serpentine cavity is aftward of the third serpentine cavity, a flag tip cavity extending aftward from proximate the leading edge to the trailing edge along the tip region, and a hybrid trailing edge cavity, wherein the first serpentine cavity is part of the hybrid trailing edge cavity and cooling air is supplied into the forward-flowing serpentine flow path from a hybrid trailing edge feed cavity inlet.

16 Claims, 8 Drawing Sheets

(51) Int. Cl.
*F01D 25/12* (2006.01)
*F01D 5/14* (2006.01)

(52) U.S. Cl.
CPC .... *F05D 2220/32* (2013.01); *F05D 2240/304* (2013.01); *F05D 2240/307* (2013.01); *F05D 2240/81* (2013.01); *F05D 2250/185* (2013.01); *F05D 2260/202* (2013.01); *F05D 2260/2212* (2013.01); *F05D 2260/22141* (2013.01)

(56) References Cited

U.S. PATENT DOCUMENTS

| | | | | |
|---|---|---|---|---|
| 6,705,836 | B2 * | 3/2004 | Bourriaud | F01D 5/186 415/115 |
| 6,974,308 | B2 * | 12/2005 | Halfmann | B22C 9/04 415/115 |
| 7,806,658 | B2 | 10/2010 | Liang et al. | |
| 8,192,146 | B2 * | 6/2012 | Liang | F01D 5/186 415/115 |
| 8,267,658 | B1 * | 9/2012 | Liang | F01D 5/187 416/97 R |
| 8,292,582 | B1 * | 10/2012 | Liang | F01D 5/187 416/1 |
| 8,616,845 | B1 | 12/2013 | Liang | |
| 8,920,123 | B2 * | 12/2014 | Lee | F01D 5/186 416/92 |
| 9,022,736 | B2 * | 5/2015 | Lee | F01D 5/186 416/97 R |
| 2014/0322008 | A1 | 10/2014 | Molter et al. | |

\* cited by examiner

AIRFOIL HAVING FORWARD FLOWING SERPENTINE FLOW

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

BRIEF DESCRIPTION

According to some embodiments, airfoils for gas turbine engines are provided. The airfoils include an airfoil body having a leading edge and a trailing edge, a root region and a tip region, wherein an aftward direction is from the leading edge toward the trailing edge and a radially outward direction is from the root region to the tip region, a forward-flowing serpentine flow path formed within the airfoil body, the forward-flowing serpentine flow path defined by a first serpentine cavity, a second serpentine cavity, and a third serpentine cavity, wherein the first serpentine cavity is aftward of the second serpentine cavity, and the second serpentine cavity is aftward of the third serpentine cavity, a flag tip cavity extending aftward from proximate the leading edge to the trailing edge along the tip region of the airfoil body, and a hybrid trailing edge cavity, wherein the first serpentine cavity is part of the hybrid trailing edge cavity. A cooling air flow is supplied into the forward-flowing serpentine flow path from a hybrid trailing edge feed cavity inlet at the hybrid trailing edge cavity, and the cooling air flow passes through the first serpentine cavity, the second serpentine cavity, the third serpentine cavity, into and through the flag tip cavity, and exits through the trailing edge of the airfoil body, and a portion of the cooling air flow exits the hybrid trailing edge cavity at the trailing edge of the airfoil body.

In addition to one or more of the features described herein, or as an alternative, further embodiments of the airfoils may include that the hybrid trailing edge cavity comprises one or more heat transfer augmentation features.

In addition to one or more of the features described herein, or as an alternative, further embodiments of the airfoils may include that the tip flag cavity comprises one or more heat transfer augmentation features.

In addition to one or more of the features described herein, or as an alternative, further embodiments of the airfoils may include at least one shielding cavity located between a portion of the forward-flowing serpentine flow path and an external surface of the airfoil body.

In addition to one or more of the features described herein, or as an alternative, further embodiments of the airfoils may include that the at least one shielding cavity comprises a first shielding cavity and a second shielding cavity.

In addition to one or more of the features described herein, or as an alternative, further embodiments of the airfoils may include that at least one of the at least one shielding cavities is located on a pressure side of the airfoil body.

In addition to one or more of the features described herein, or as an alternative, further embodiments of the airfoils may include that the at least one shielding cavity extends radially through the airfoil body from the root region to the tip region.

In addition to one or more of the features described herein, or as an alternative, further embodiments of the airfoils may include a radially extending partitioning rib extending radially and separating the hybrid trailing edge cavity from the second serpentine cavity, wherein the hybrid trailing edge cavity is fluidly connected to the second serpentine cavity at a radially outward end of the radially extending partitioning rib.

In addition to one or more of the features described herein, or as an alternative, further embodiments of the airfoils may include a resupply connection fluidly connecting the hybrid trailing edge cavity to the second serpentine cavity at a radially inward end of the radially extending partitioning rib.

In addition to one or more of the features described herein, or as an alternative, further embodiments of the airfoils may include a platform wherein the root region of the airfoil body is integral with the platform.

In addition to one or more of the features described herein, or as an alternative, further embodiments of the airfoils may include that the hybrid trailing edge feed cavity inlet supplies serpentine cooling air through the platform and into the airfoil body.

According to some embodiments, gas turbine engines are provided. The gas turbine endings include a turbine section comprising a plurality airfoils. At least one airfoil includes an airfoil body having a leading edge and a trailing edge, a root region and a tip region, wherein an aftward direction is from the leading edge toward the trailing edge and a radially outward direction is from the root region to the tip region, a forward-flowing serpentine flow path formed within the airfoil body, the forward-flowing serpentine flow path defined by a first serpentine cavity, a second serpentine cavity, and a third serpentine cavity, wherein the first serpentine cavity is aftward of the second serpentine cavity, and the second serpentine cavity is aftward of the third serpentine cavity, a flag tip cavity extending aftward from proximate the leading edge to the trailing edge along the tip region of the airfoil body, and a hybrid trailing edge cavity, wherein the first serpentine cavity is part of the hybrid trailing edge cavity. A cooling air flow is supplied into the forward-flowing serpentine flow path from a hybrid trailing edge feed cavity inlet at the hybrid trailing edge cavity, and the cooling air flow passes through the first serpentine cavity, the second serpentine cavity, the third serpentine cavity, into and through the flag tip cavity, and exits through the trailing edge of the airfoil body, and a portion of the cooling air flow exits the hybrid trailing edge cavity at the trailing edge of the airfoil body.

In addition to one or more of the features described herein, or as an alternative, further embodiments of the gas turbine engines may include that at least one of the hybrid trailing edge cavity and the tip flag cavity includes one or more heat transfer augmentation features.

In addition to one or more of the features described herein, or as an alternative, further embodiments of the gas turbine engines may include that the airfoil body further includes at least one shielding cavity located between a portion of the forward-flowing serpentine flow path and an external surface of the airfoil body.

In addition to one or more of the features described herein, or as an alternative, further embodiments of the gas turbine engines may include that the at least one shielding cavity comprises a first shielding cavity and a second shielding cavity.

In addition to one or more of the features described herein, or as an alternative, further embodiments of the gas turbine engines may include that at least one of the at least one shielding cavities is located on a pressure side of the airfoil body.

In addition to one or more of the features described herein, or as an alternative, further embodiments of the gas turbine engines may include that the at least one shielding cavity extends radially through the airfoil body from the root region to the tip region.

In addition to one or more of the features described herein, or as an alternative, further embodiments of the gas turbine engines may include that the airfoil body further includes a radially extending partitioning rib extending radially and separating the hybrid trailing edge cavity from the second serpentine cavity, wherein the hybrid trailing edge cavity is fluidly connected to the second serpentine cavity at a radially outward end of the radially extending partitioning rib.

In addition to one or more of the features described herein, or as an alternative, further embodiments of the gas turbine engines may include that the airfoil body further includes a resupply connection fluidly connecting the hybrid trailing edge cavity to the second serpentine cavity at a radially inward end of the radially extending partitioning rib.

In addition to one or more of the features described herein, or as an alternative, further embodiments of the gas turbine engines may include a platform wherein the root region of the airfoil body is integral with the platform.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
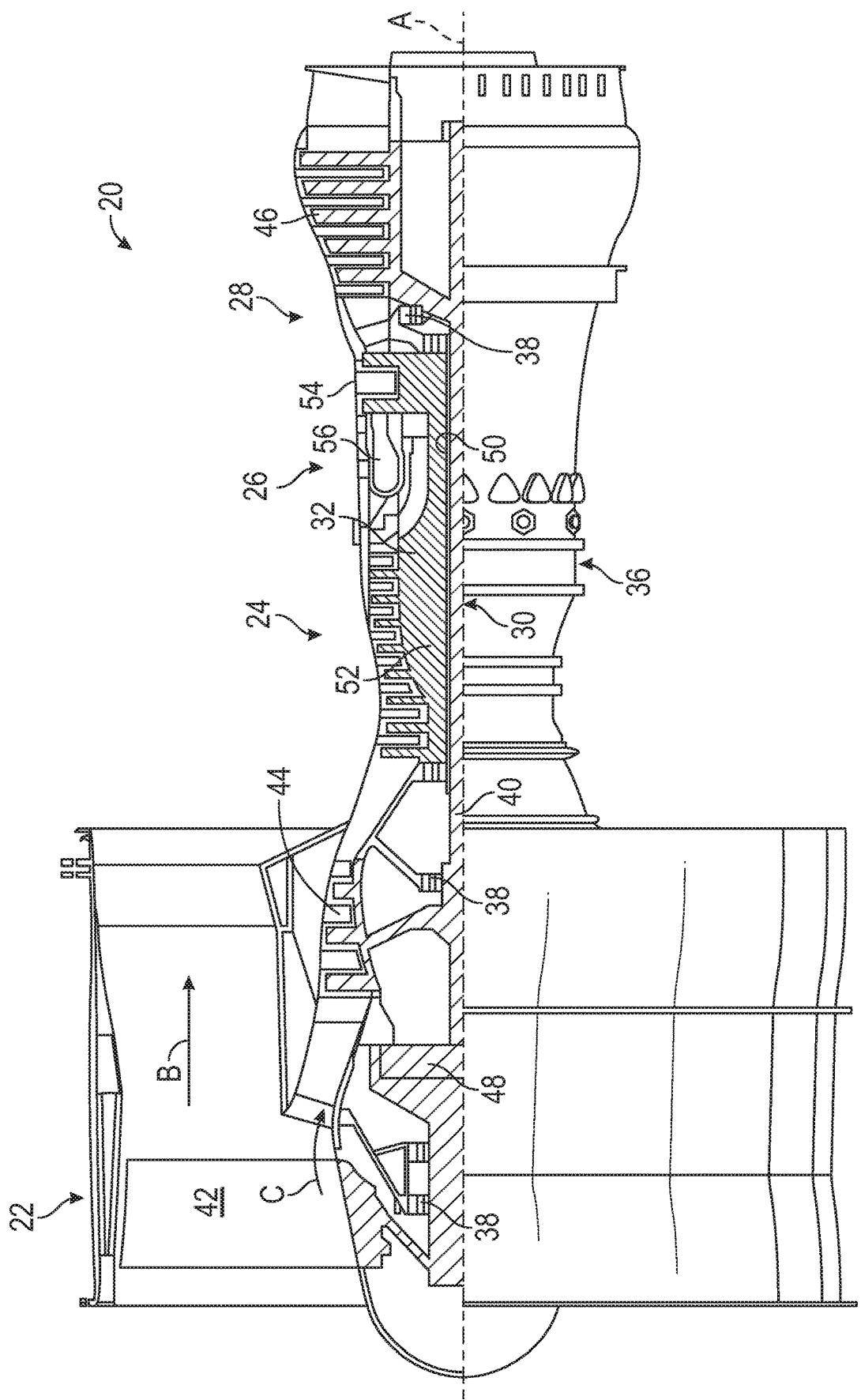
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
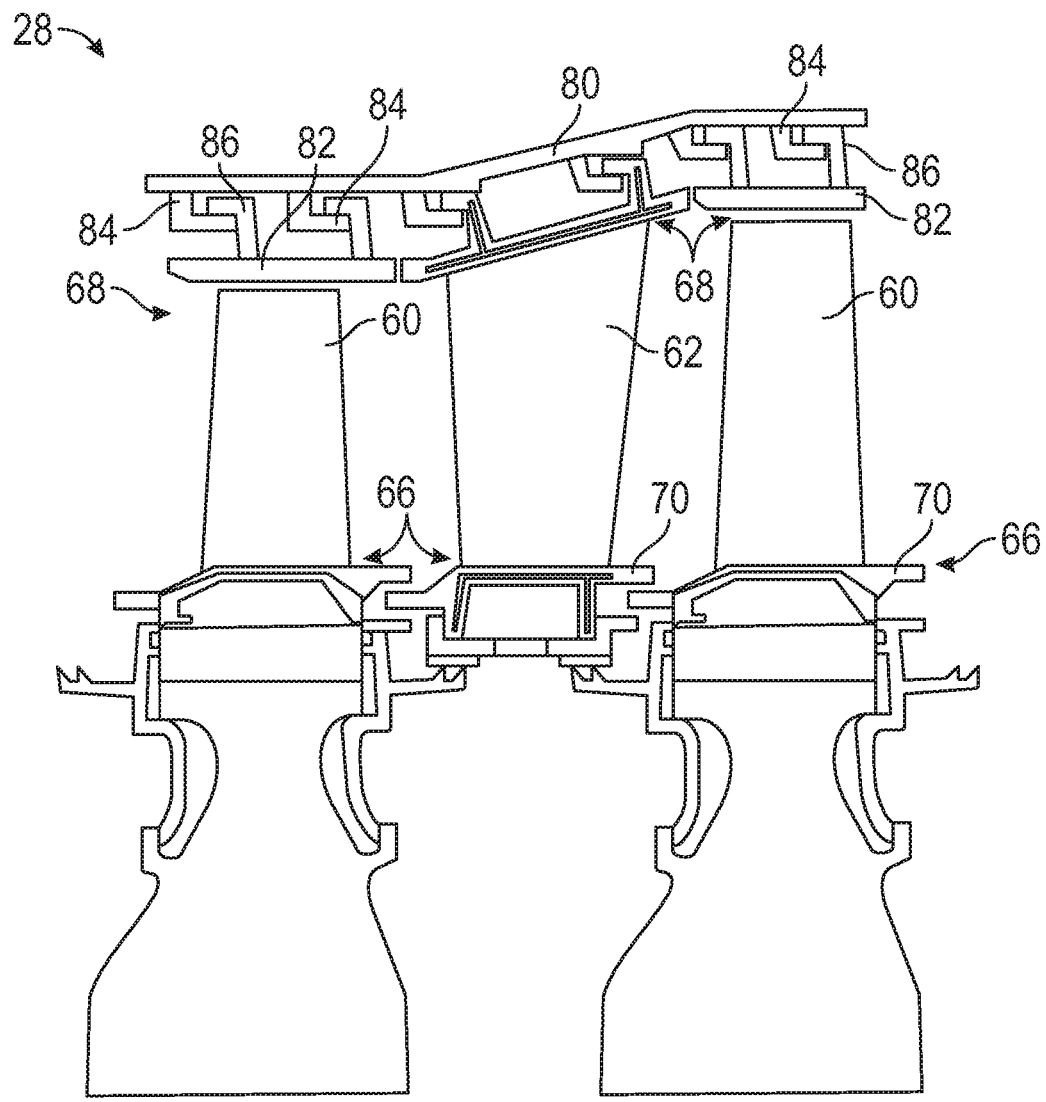
FIG. 2 is a schematic illustration of a portion of a turbine section of the gas turbine engine of FIG. 1.

FIG. 2 is a schematic view of a portion of the turbine section 28 that may employ various embodiments disclosed herein. Turbine section 28 includes a plurality of airfoils 60, 62 including, for example, one or more blades and vanes. The airfoils 60, 62 may be hollow bodies with internal cavities defining a number of channels or cores, hereinafter airfoil cores, formed therein and extending from an inner diameter 66 to an outer diameter 68, or vice-versa. The airfoil cores may be separated by partitions within the airfoils 60, 62 that may extend either from the inner diameter 66 or the outer diameter 68 of the airfoil 60, 62. The partitions may extend for a portion of the length of the airfoil 60, 62, but may stop or end prior to forming a complete wall within the airfoil 60, 62. Thus, each of the airfoil cores may be fluidly connected and form a fluid path within the respective airfoil 60, 62. The airfoils 60, 62 may include platforms 70 located proximal to the inner diameter 66 thereof. Located below the platforms 70 (e.g., radially inward with respect to the engine axis) may be airflow ports and/or bleed orifices that enable air to bleed from the internal cavities of the airfoils 60, 62. A root of the airfoil may connect to or be part of the platform 70.

The turbine section 28 is housed within a case 80, which may have multiple parts (e.g., turbine case, diffuser case, etc.). In various locations, components, such as seals, may be positioned between airfoils 60, 62 and the case 80. For example, as shown in FIG. 2, blade outer air seals 82 (hereafter "BOAS") are located radially outward from the blade 60. As will be appreciated by those of skill in the art, the BOAS 82 may include BOAS supports that are configured to fixedly connect or attach the BOAS 82 to the case 80 (e.g., the BOAS supports may be located between the BOAS 82 and the case 80). As shown in FIG. 2, the case 80 includes a plurality of case hooks 84 that engage with BOAS hooks 86 to secure the BOAS 82 between the case 80 and a tip of the airfoil 60.

Figure 3:
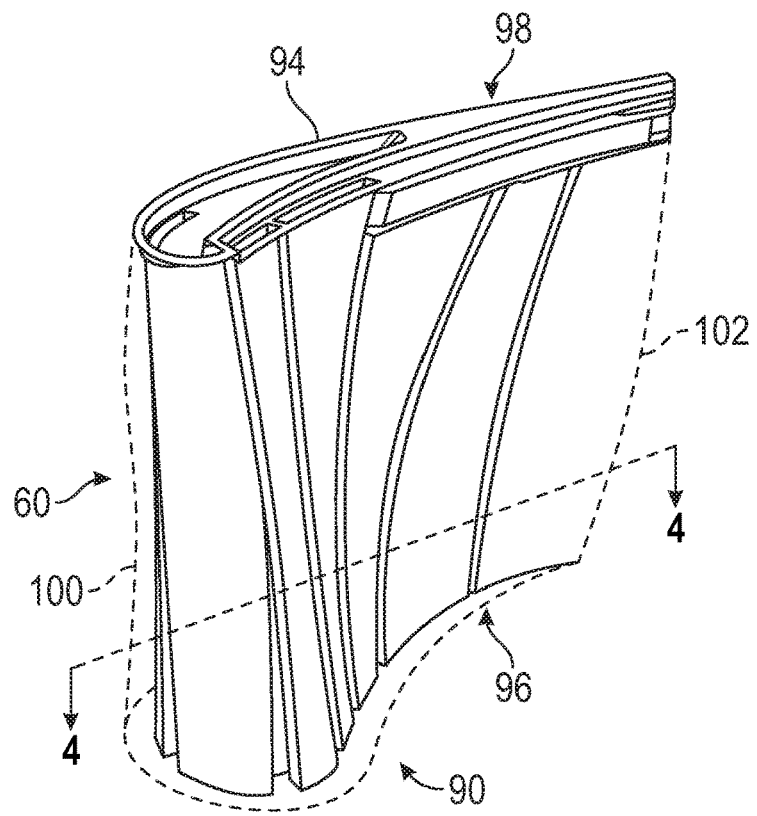
FIG. 3 is a perspective view of an airfoil that can incorporate embodiments of the present disclosure.
Figure 4:
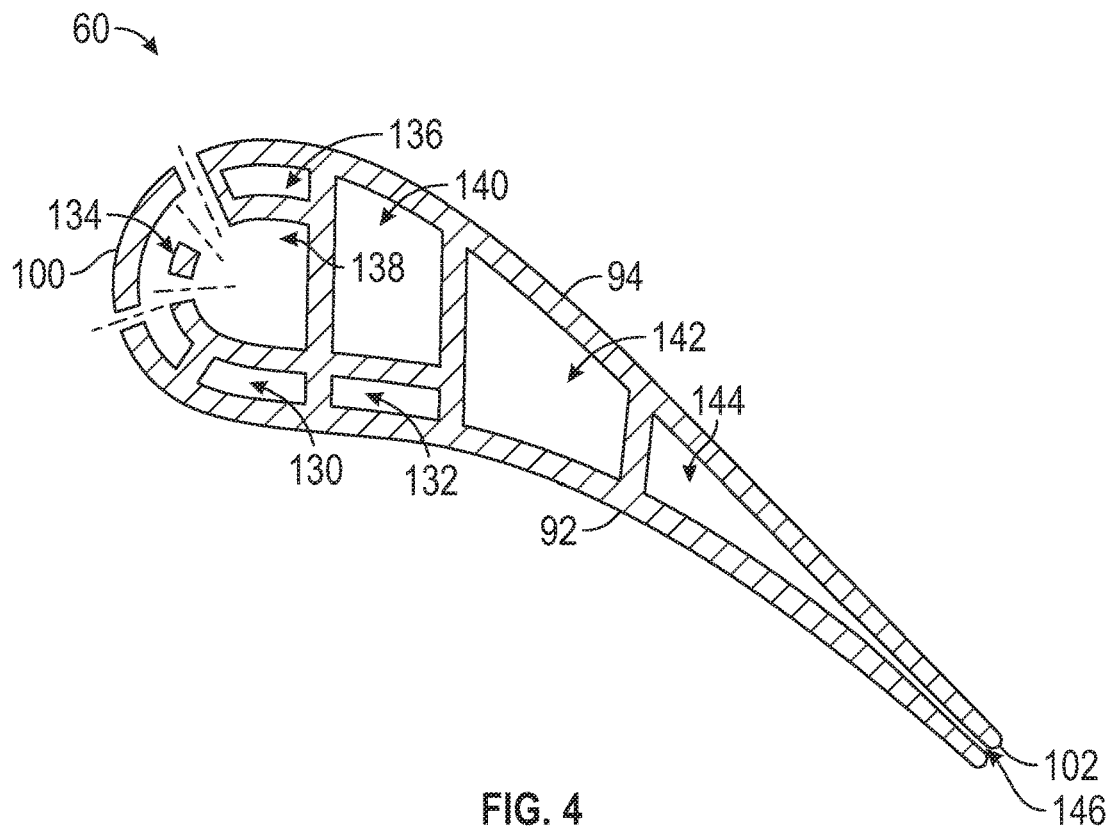
FIG. 4 is a partial cross-sectional view of the airfoil of FIG. 3 as viewed along the line 4-4 shown in FIG. 3.

As shown in FIGS. 3-4, the airfoil 60 includes an airfoil body 90 having a pressure side 92, a suction side 94, a root region 96, a tip region 98, a leading edge 100, and a trailing edge 102. The pressure side 92 is disposed opposite the suction side 94. The pressure side 92 and the suction side 94 each extend radially from the root region 96 to the tip region 98. As used herein, the term "radial" refers to radial with respect to an engine axis (e.g., engine central longitudinal axis A shown in FIG. 1). The pressure side 92 and the suction side 94 each extend generally axially and/or tangentially (e.g., with respect to the engine axis) between the leading edge 100 and the trailing edge 102. Each of the root region 96 and the tip region 98 extend from the leading edge 100 to the trailing edge 102 opposite each other at ends of the airfoil body 90 in the radial direction. That is, the root region 96 defines an inner radial end of the airfoil body 90 and the tip region defines an outer radial end of the airfoil body 90 (relative to an engine axis). The airfoil 60 may be a blade or vane, and have various other features associated with such configurations, e.g., platforms, tip surfaces, etc.

Figure 5:
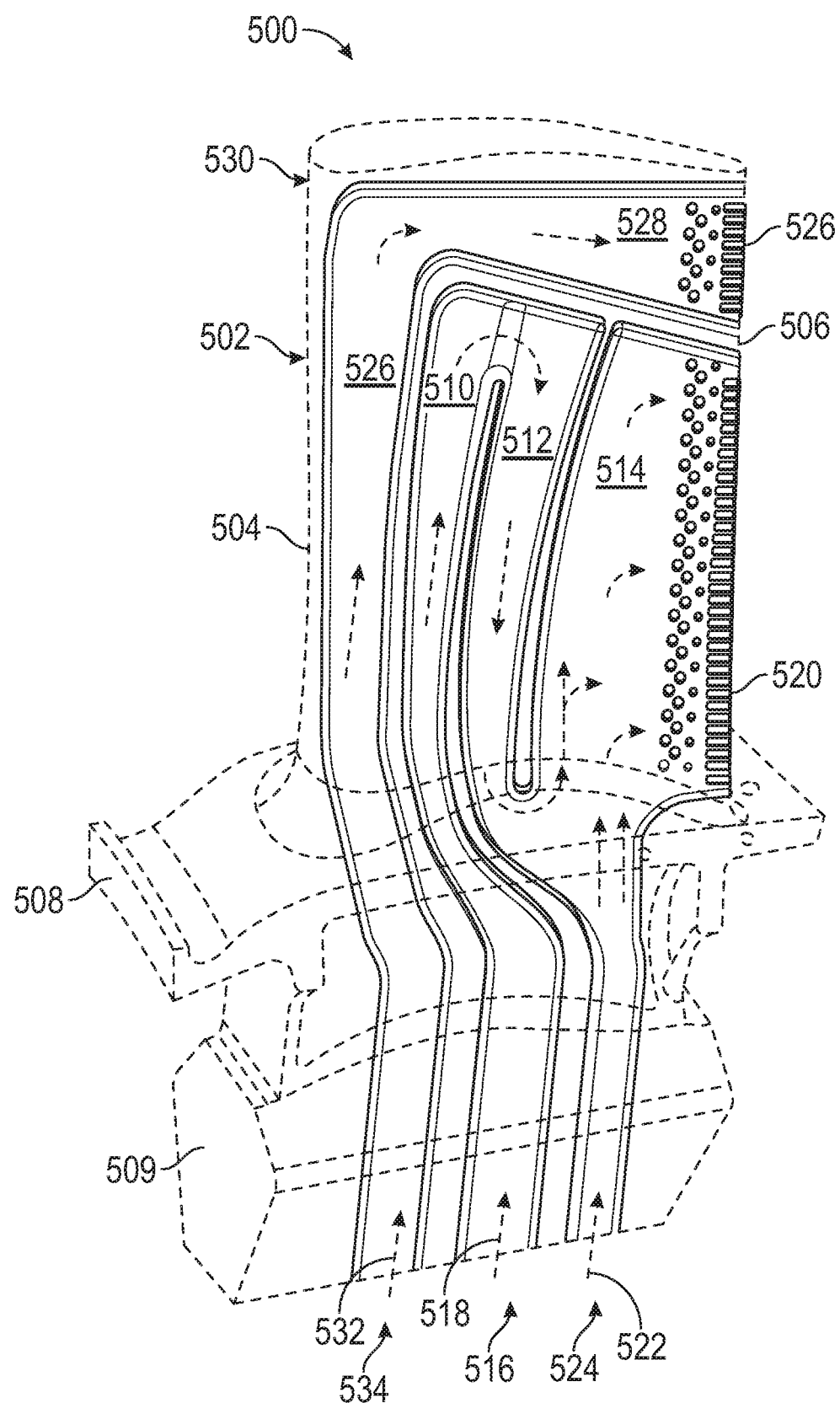
FIG. 5 is a schematic illustration of an airfoil in accordance with an embodiment of the present disclosure.

As shown in FIGS. 4-5, illustrating a cross-sectional view of the airfoil 60 as viewed along the line 4-4 shown in FIG. 3, the airfoil body 90 defines or includes a plurality of internal cavities to enable cooling of the airfoil 60. For example, as shown, the airfoil 60 includes a plurality of forward and side cooling skin core cooling cavities 130, 132, 134, 136, 138 immediately proximate the external hot wall surfaces. In the relative middle of the airfoil body 90, the airfoil 60 includes various serpentine flow cavities 140, 142, 144 and, at the trailing edge 102, a trailing edge slot 146. The most aftward (aft-flowing) serpentine flow cavity 144 defines a serpentine trailing edge core that fluidly connects to the trailing edge slot 146 that is formed at the trailing edge 102. In the present illustration, a first serpentine cavity 140 may be arranged for flow in a first direction (e.g., an up pass cooling flow), a second serpentine cavity 142 may be arranged for flow in a second direction (e.g., a down pass cooling flow), and a third serpentine cavity 144 may be arranged for flow in the first direction and/or a third direction (e.g., an up pass cooling flow that exits the airfoil 60 through the trailing edge slot 146). Although shown with a specific internal cooling cavity arrangement, airfoils in accordance with the present disclosure may include additional and/or alternative cavities, flow paths, channels, etc. as will be appreciated by those of skill in the art, including, but not limited to, tip cavities, serpentine cavities, trailing edge cavities, etc.

Airfoils, as will be appreciated by those of skill in the art, may incorporate trailing edge core geometries that include and/or require a resupply feed to provide additional cooling air to the trailing edge region. However, such orientations may lead to increased part weight, reduced cooling efficiencies, et.

Turning now to FIG. 5, a schematic illustration of an airfoil 500 having an airfoil body 502 with a leading edge 504 and a trailing edge 506 is shown. In the present illustrative example, the airfoil 500 is shown as a blade with the airfoil body 502 extending from a platform 508. The platform 508 is arranged to connect to or otherwise attach to a rotor disc for operation within a gas turbine engine by means of attachment 509 (which may be integral or separate from the airfoil body 502). In some non-limiting arrangements, the platform 508 and attachment 509 may be integrally formed with the rotor disc, or in some embodiments the attachment 509 may be integral with a rotor disc and the platform 508 may be attached to the attachment 509.

The airfoil body 502 and the platform 508 include internal cooling passages and cavities that are arranged to enable cooling air to flow through the internal portions of the airfoil 500 to provide cooling during operation. Illustratively shown in FIG. 5 is a serpentine cavity including cavities 510, 512, 514, which each define a portion of a serpentine cooling flow path. A first serpentine cavity 510 is an up pass cavity, as illustratively shown, with a serpentine inlet 516 supplying serpentine cooling air 518 through the platform 508 and into the airfoil body 502. The serpentine cooling air 518 flows upward (e.g., radially outward when installed within a gas turbine engine) through the first serpentine cavity 510. The serpentine cooling air 518 then turns and flows downward (radially inward) through a second serpentine cavity 512. The serpentine cooling air 518 then will turn again and flow upward (radially outward) into and through a third serpentine cavity 514. The serpentine cooling air 518 will then exit the airfoil 500 through one or more trailing edge slots 520 at the trailing edge 506. As shown, this illustration shows an aftward flow (aft-flowing) of cooling air 518 through the serpentine cavities 510, 512, 514, i.e., flowing generally from the leading edge 504 toward (and out) the trailing edge 506.

As the serpentine cooling air 518 flows through the serpentine cavities 510, 512, 514 the air will absorb heat from the material of the airfoil body 502. Accordingly, the thermal cooling efficiency of the serpentine cooling air 518 will decrease as the air moves through the serpentine cavities 510, 512, 514 as a result of the increase in heat pickup of the cooling air temperature as it migrates through the circuitous serpentine cooling passages. To improve the thermal cooling effectiveness toward the trailing edge 506 of the airfoil 500, e.g., within the third serpentine cavity 514, resupply air 522 can be introduced into the airfoil 500 through a resupply inlet 524 that is formed within the attachment 509. The resupply air 522 will interact with the serpentine cooling air 518 at a junction within the airfoil 500, as shown in FIG. 5.

Also shown in FIG. 5 is a leading edge cavity 526 and a tip flag cavity 528 are provided along the leading edge 504 and a tip region 530. Tip flag cooling air 532 is supplied through a leading edge inlet 534. The tip flag cooling air 532 provide cooling toward the leading edge 504 of the airfoil 500. In some embodiments, the leading edge cavity 526 may be substantially adjacent the leading edge 504 of the airfoil body 502 as well as the hot surfaces of the pressure and suction sides of the airfoil body 502. In other embodiments, the leading edge cavity 526 can be contained within "cold" walls, such as that shown in FIG. 4 (see, e.g., cavity 138). Various other arrangements are possible, as will be appreciated by those of skill in the art. The tip flag cooling air 532 flows radially outward through the airfoil body 502 from the platform 508 toward the tip region 530 and then turns aftward to flow predominantly in an axial direction through the tip flag cavity 528 and then exits through one or more trailing edge slots 520 at the trailing edge 506. Those of skill in the art will appreciate that additional pressure side hybrid skin core cooling cavities can be provided for shielding purposes (e.g., as shown in FIG. 4) in order to mitigate cooling air temperature heat pickup within the forward flowing serpentine cooling passages. The reduction in cooling air temperature enables the maximum differential possible between the local external driving gas/film temperature and the internal cooling air temperature. By maximizing the local temperature differential between the external driving gas/film temperature and the internal cooling temperature, the local cooling effectiveness and thermal performance proximate the blade tip airfoil region can be significantly increased. In turn, the improvement in blade airfoil tip oxidation and Thermal Mechanical Fatigue ("TMF") durability capability enables the retention of the blade alloy/coasting material proximate the tip region 530. The increase in thermal cooling effectiveness enables lower blade tip operating metal temperatures and retention of tight blade tip running clearances significantly increasing turbine component efficiency over the life cycle of engine operation.

Embodiments of the present disclosure are directed to airfoils (blades, vanes, etc.) having hybrid skin core cooling cavities located immediately adjacent to the external hot wall on the pressure side of the airfoil in order to shield at least a portion of the serpentine cavities from the high external airfoil pressure side surface static pressures and high external heat flux that results from hot gas segregation, aerodynamic three-dimensional gas migration, local surface curvature, and local external surface roughness. Such arrangement allows for a forward-flowing serpentine cooling configuration to be executed without the need to account for outflow margin and/or backflow margin considerations typically associated with more conventional forward flowing serpentine cooling circuit design concepts. This is because there are no exit apertures (e.g., film holes, etc.) exiting to the relatively high external airfoil gas path surface static pressures that exist along the external forward pressure side airfoil surface 92. More conventional single-wall, forward-flowing serpentine design concepts incorporating pressure side film cooling purge flow are limited by the amount of pressure loss that can be utilized within the serpentine cooling circuit necessary for maximizing internal convective heat transfer cooling. This is because adequate pressure outflow and back flow margin consideration must be accounted for to ensure a positive "out flow" condition of the pressure side film cooling holes discharged along the external forward pressure side surface under worst case system, casting, and manufacturing tolerance conditions. In this sense, conventional single-wall, forward-flowing serpentine design concepts may be restrictive and have limited convective cooling capability as a result of positive "out flow" pressure requirements. In addition to the pressure loss concerns, the utilization of a predominately axially flowing tip flag cooling cavity in conjunction with a conventional forward flowing serpentine design concepts is also not viable due to the excessive cooling air heat pick that occurs due to the single wall exposure of high external heat flux occurring on along both the pressure surface 92 and suction surface 94.

Figure 6A:
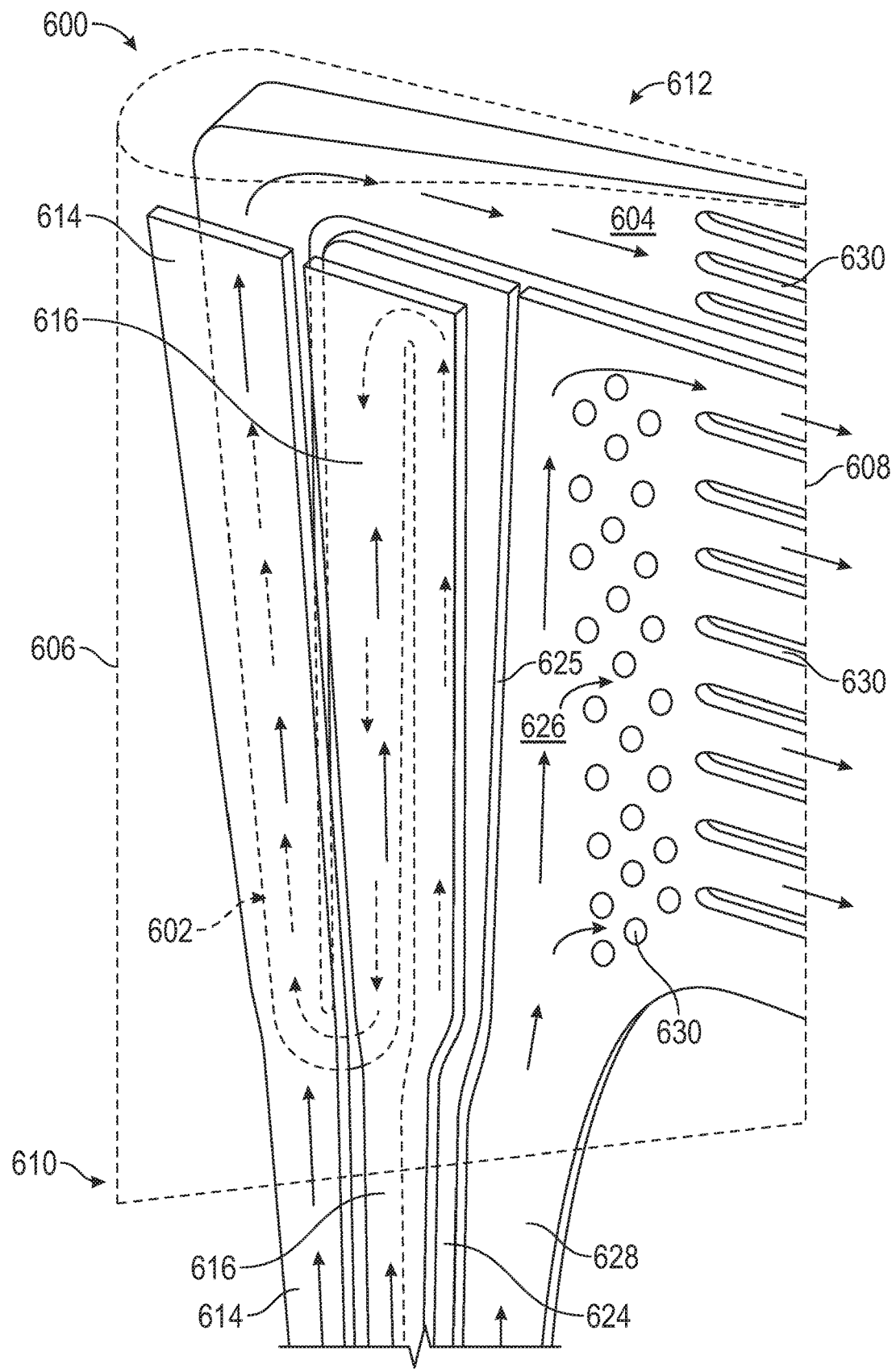
FIG. 6A is a schematic illustration of interior cooling cavities of an airfoil in accordance with an embodiment of the present disclosure.
Figure 6B:
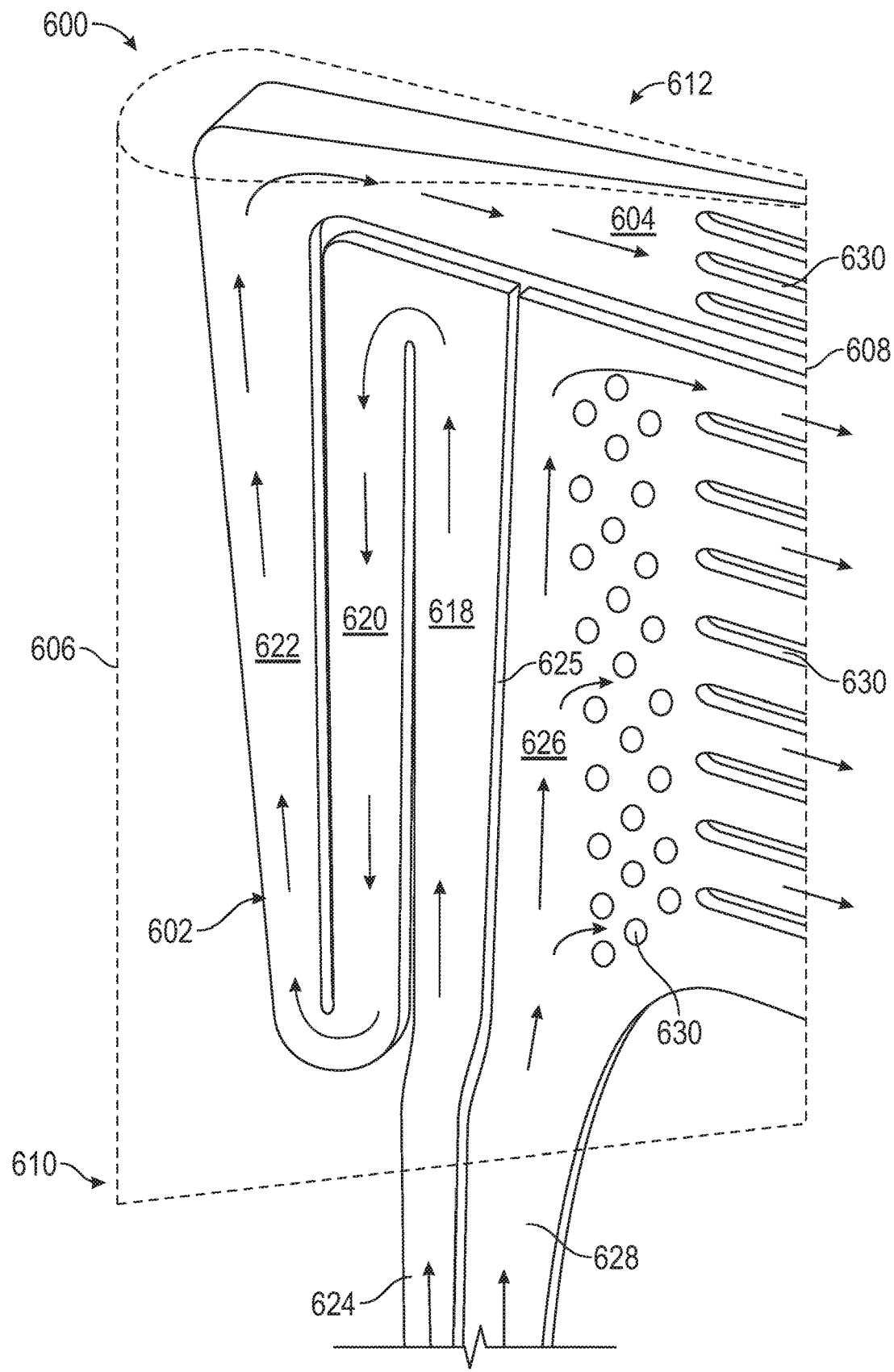
FIG. 6B is a schematic illustration of the airfoil of FIG. 6A with certain cavities omitted for illustrative and explanatory purposes.

Turning now to FIGS. 6A-6B, a forward-flowing serpentine design concept used in conjunction with a predominately axially-flow tip flag cooling cavity is viable with the incorporation of pressure side skin core cooling channels 614 and 616 shown in FIG. 6A, which provide "shielding" of the high external heat flux present along the airfoil pressure side surface 92. In this arrangement, in accordance with embodiments of the present disclosure, there is a significant reduction in cooling air temperature heat pickup that occurs within the forward-flowing serpentine and tip flag cooling circuit. Additionally, in some embodiments, there is no design need or requirement for internal heat transfer augmentation features (e.g., trips strips, pin fins, etc.) along the serpentine channels 618, 620, or 622 adjacent to the inner cold wall surfaces. Elimination of these internal heat transfer augmentation features minimizes pressure loss and cooling air temperature heat pickup within the forward-flowing serpentine cooling circuit and tip flag cooling cavity 604 which enables effective outflow margin and convective cooling proximate the airfoil tip region 612.

The forward-flowing serpentine cavities may fluidly connect to the tip flag cavity, and thus can eliminate "dead zones," i.e., regions of low internal coolant velocities, separated and/or recirculating flow regions within the cooling circuit channels that result in poor backside convective cooling flow characteristics producing low local thermal cooling effectiveness and thermal performance. Further, embodiments provided herein allow for dedicated cooled areas that have the high heat flux into the airfoil such as at the leading edge and/or the trailing edge. Further, in some embodiments, the trailing edge cavity may be fluidly connected to or part of the forward-flowing serpentine. Having the forward-flowing serpentine connected to the trailing edge cavity can eliminate a "dead zone" (e.g., a region of low internal velocity, Reynolds number, and convective heat transfer that naturally exists at the end of a "dead ended" cooling passages similar to the trailing edge feed cavity 514 shown in FIG. 5). In this instance the reduction in local backside convective heat transfer is drastically reduced and therefore results in poor thermal cooling effectiveness characteristics, increased metal temperature, and reduced durability capability resulting in premature oxidation erosion of the local coating system and alloy material. To address this adverse flow condition, it is often necessary to add additional cooling flow locally through incorporation of local film cooling. Although incorporating local film cooling activates the internal cooling flow locally and reduces local external heat flux by providing a protective film boundary, it comes at the expense of increase cooling flow requirements which adversely impacts turbine efficiency as well as increases momentum mixing losses that occur between high velocity external gas path flow and the lower velocity film cooling flow being ejected into the freestream.

Again referencing FIGS. 6A-6B, schematic illustrations of an airfoil 600 in accordance with an embodiment of the present disclosure are shown. FIG. 6A illustrates an interior cooling flow path within the airfoil 600 having a forward-flowing serpentine flow path 602 that is fluidly connected to a tip flag cavity 604. The airfoil 600, as shown, has a leading edge 606, a trailing edge 608, a root region 610, and a tip region 612. The airfoil 600 extends radially outward in a direction from the root region 610 to the tip region 612 and extends axially (from forward to aft) in a direction from the leading edge 606 to the trailing edge 608. As shown in FIG. 6A, first and second shielding cavities 614, 616 are positioned adjacent the forward-flowing serpentine flow path 602. FIG. 6B illustrates the airfoil 600 without the first and second shielding cavities 614, 616 for clarity and illustrative purposes.

As shown in FIG. 6B, the forward-flowing serpentine flow path 602 includes cavities 618, 620, 622, which each define a portion of a serpentine cooling flow path. A first serpentine cavity 618 is an up pass cavity, as illustratively shown, with a serpentine inlet 624 suppling serpentine cooling air through a platform and into the body of the airfoil 600 (e.g., as shown and described above). The serpentine cooling air flows upward (e.g., radially outward when installed within a gas turbine engine) through the first serpentine cavity 618. The serpentine cooling air then turns forward and flows downward (radially inward) through a second serpentine cavity 620. The serpentine cooling air then will turn forward again and flow upward (radially outward) into and through a third serpentine cavity 622. The serpentine cooling air will then turn aftward and flow in a predominantly axial direction through the tip flag cavity 604. The cooling air will then exit the airfoil 600 through a trailing edge slot of the tip flag cavity 604 at the trailing edge 608. In contrast to that shown in FIG. 5, this illustration shows a forward flow (forward-flowing) of cooling air through the serpentine cavities 618, 620, 622, i.e., flowing generally from the trailing edge 608 end of the airfoil 600 toward the leading edge 606, in a generally forward direction.

A trailing edge cavity 626 is located aft of the first serpentine cavity 618 and fluidly separated therefrom by a radially extending dividing rib 625. The trailing edge cavity 626 is supplied with a dedicated trailing edge cooling flow through a trailing edge inlet 628. As schematically shown, the trailing edge cavity 626 and the tip flag cavity 604 can include heat transfer augmentation features 630, with some such heat transfer augmentation features 630 located proximate the trailing edge 608. The heat transfer augmentation features 630 can be pedestals, racetracks, chevrons, or other structures located within the respective cavities.

Referring again to FIG. 6A, the first and second shielding cavities 614, 616 are positioned between portions of the forward-flowing serpentine flow path 602 and the external surface of the airfoil 600 that is directly exposed to the freestream hot gas path air. The first and second shielding cavities 614, 616 are radially extending cavities that extend from the root region 610 to the tip region 612, and cooling air can flow therethrough from the root region 610 to the tip region 612. In some embodiments, the cooling air within the first and second shielding cavities 614, 616 can exit to the exterior of the airfoil 600 such that a film layer is formed along the exterior tip surface of the airfoil.

For example, the first and second shielding cavities 614, 616 can be positioned between portions of the forward-flowing serpentine flow path 602 and a pressure side of the airfoil 600. Thus, the first and second shielding cavities 614,

616 shield portions of the forward-flowing serpentine flow path 602 from high pressure side static pressures. As such, the forward-flowing serpentine flow path 602 may be arranged without adverse impacts associated with low outflow margins and/or backflow margins.

Embodiments of the present disclosure, such as shown in FIGS. 6A-6B, allow for dedicated air for high heat flux areas that are challenged thermally (e.g., trailing edge cavity 626). By having dedicated air in high heat load regions the cooling circuit can be optimized because the coldest air is being utilized to maximize both the backside convective cooling as well as reduce the local external film cooling temperature. In so doing, the highest local thermal cooling effectiveness using the least amount of cooling mass flow can be achieved. As a result, significant improvements in turbine aerodynamic performance, oxidation life, and Thermal Mechanical Fatigue (TMF) capability can be achieved. Such design optimization can yield in a reduction in total airfoil cooling flow and supply pressure requirements, thereby minimizing parasitic leakage air which inherently produces large momentum mixing losses, decreases turbine stage and component efficiency resulting in increases in fuel burn and Total Specific Fuel Consumption (TSFC).

Although the present description and accompanying illustrations depict an airfoil with two pressure side skin core cooling cavities, embodiments of the present disclosure are not so limited. In addition to varying in number, those of skill in the art will appreciate that shielding cavities can be located along any hot surface to protect an internal cavity or structure. Thus, it should be understood by those of skill in the art that any number of pressure and/or suction side skin cooling cavity core channels may be utilized as shielding cavities depending on heat load, cooling mass flow, aerodynamic geometry, and durability life requirements.

Further, although shown as a three-channel, forward-flowing serpentine flow path 602, those of skill in the art will appreciate that various other arrangements of forward-flowing serpentine flow paths may be incorporated into embodiments of the present disclosure. For example, in some embodiments, a five-channel arrangement may be present within an airfoil having shielding cavities protecting at least part of the forward-flowing serpentine flow path. Further, as will be appreciated by those of skill in the art, a four-channel arrangement may be employed. That is, embodiments of the present disclosure are directed to any number of channels forming a protected serpentine flow path that flows in a forward direction, with a forward most channel of the forward-flowing serpentine flow path flowing radially upward or outward and fluidly connects to a tip flag cavity.

Figure 7A:
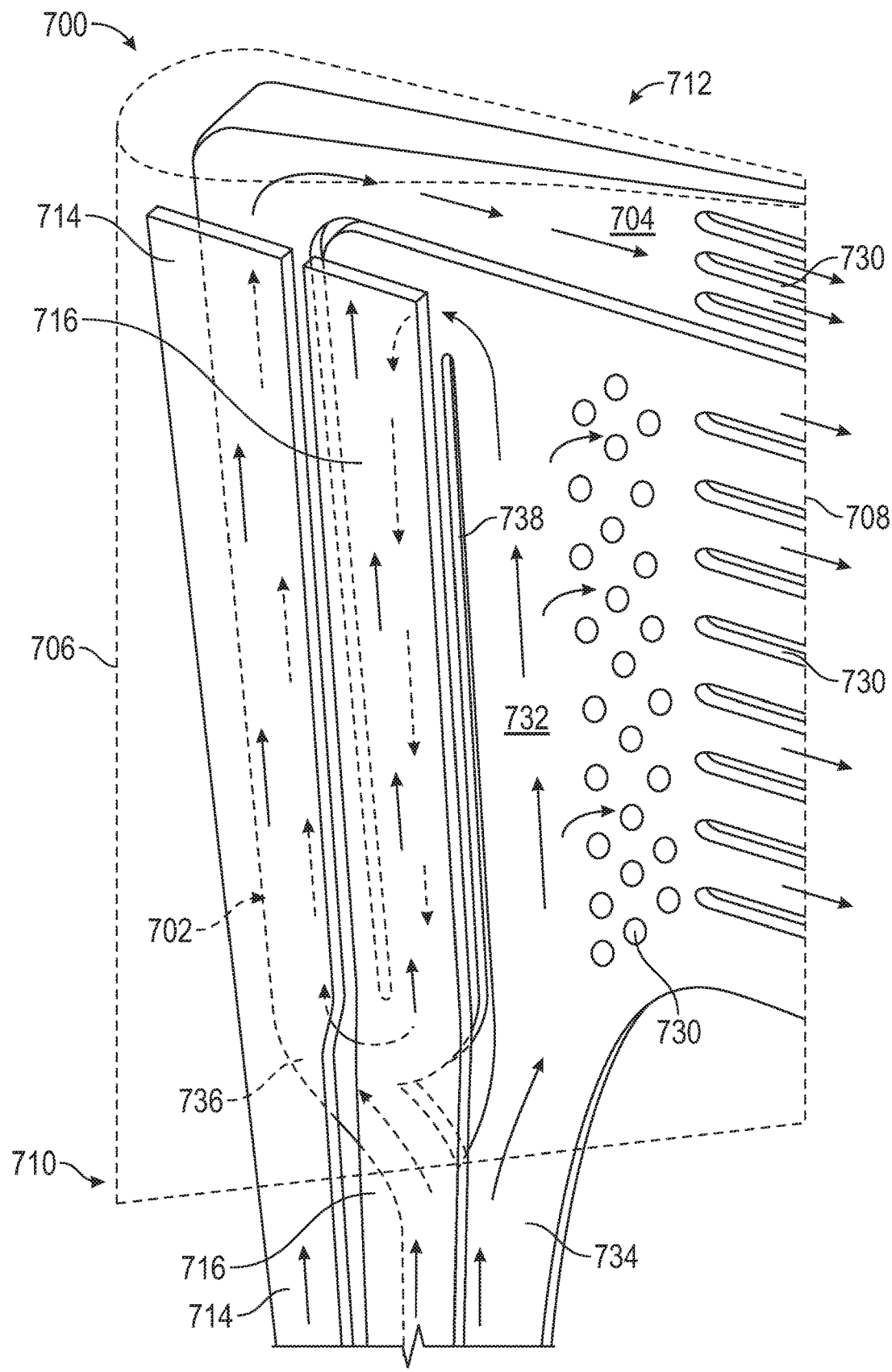
FIG. 7A is a schematic illustration of interior cooling cavities of an airfoil in accordance with another embodiment of the present disclosure.
Figure 7B:
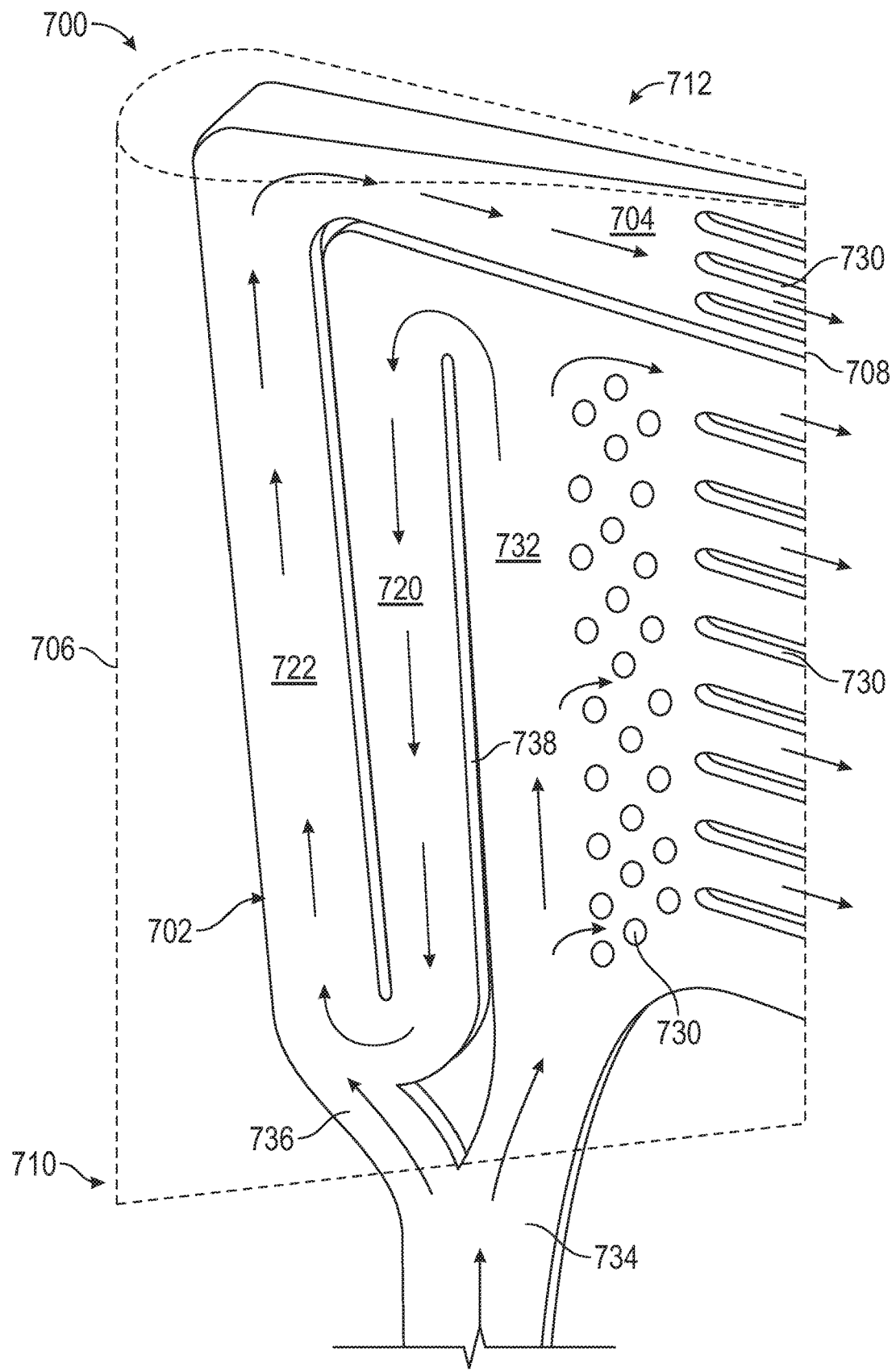
FIG. 7B is a schematic illustration of the airfoil of FIG. 6A with certain cavities omitted for illustrative and explanatory purposes.

Turning now to FIGS. 7A-7B, schematic illustrations of an airfoil 700 in accordance with another embodiment of the present disclosure are shown. FIG. 7A illustrates an interior cooling flow path within the airfoil 700 having a forward-flowing serpentine flow path 702 that is fluidly connected to a tip flag cavity 704. The airfoil 700, as shown, has a leading edge 706, a trailing edge 708, a root region 710, and a tip region 712. The airfoil 700 extends radially outward in a direction from the root region 710 to the tip region 712 and extends axially (from forward to aft) in a direction from the leading edge 706 to the trailing edge 708. As shown in FIG. 7A, first and second shielding cavities 714, 716 are positioned adjacent the forward-flowing serpentine flow path 702. FIG. 7B illustrates the airfoil 700 without the first and second shielding cavities 714, 716 for clarity and illustrative purposes.

As shown in FIG. 7B, the forward-flowing serpentine flow path 702 includes serpentine cavities 720, 722, which each define a portion of a serpentine cooling flow path. In contrast to the embodiment of FIGS. 6A-6B, the airfoil 700 includes a hybrid trailing edge cavity 732 that is arranged to supply cooling air through the trailing edge 708 as well as function as a first (up pass) portion of the forward-flowing serpentine flow path 702. That is, the first portion of the forward-flowing serpentine flow path 702 is integral with the trailing edge cavity, or stated another way, the trailing edge cavity forms the first portion of the forward-flowing serpentine flow path 702. Thus, the hybrid trailing edge cavity 732 is a first serpentine cavity that is an up pass cavity, as illustratively shown, with a hybrid trailing edge feed cavity inlet 734 suppling serpentine cooling air through a platform and into the body of the airfoil 700 as well as supplying cooling air into and through the trailing edge 708 of the airfoil 700 (i.e., through the hybrid trailing edge cavity 732). As shown, the hybrid trailing edge feed cavity inlet 734 includes a resupply connection 736 that provides resupply air into the forward-flowing serpentine flow path 702 at a junction of the serpentine cavities 720, 722. A radially extending partitioning rib 738 that separates the hybrid trailing edge cavity 732 from the second serpentine cavity 720, but enables fluid connection at the radially inward and radially outward extents of the radially extending partitioning rib 738. The fluid connections at the radially inward extend of the radially extending partitioning rib 738 is positioned to allow for the resupply connection 736.

A portion of the cooling air supplied through the hybrid trailing edge feed cavity inlet 734 flows upward (e.g., radially outward when installed within a gas turbine engine) through the hybrid trailing edge cavity 732 and a portion flows upward into the forward-flowing serpentine flow path 702 through the resupply connection 736. The cooling air within the hybrid trailing edge cavity 732 will divide such that a portion of the cooling air will cool and exit through the trailing edge 708 of the airfoil 700 and a portion will flow radially outward to the outward radial extent of the radially extending partitioning rib 738 and turn forward and flow downward (radially inward) through the second serpentine cavity 720. The serpentine cooling air then will turn forward again and flow upward (radially outward) into and through the third serpentine cavity 722. This air is resupplied from the resupply connection 736. The resupplied air provided from the resupply connection 736 can inject cool air to maintain desired cooling temperatures and pressure levels of the airflow through the forward-flowing serpentine flow path 702. The serpentine cooling air will then turn aftward and flow predominantly in an axial direction through the tip flag cavity 704. The cooling air will then exit the airfoil 700 through a trailing edge slot of the tip flag cavity 704 at the trailing edge 708. As schematically shown, the hybrid trailing edge cavity 732 and the tip flag cavity 704 can include heat transfer augmentation features 730, with some such heat transfer augmentation features 730 located proximate the trailing edge 708. The heat transfer augmentation features 730 can be pedestals, racetracks, chevrons, or other structures located within the respective cavities.

Referring again to FIG. 7A, the first and second shielding cavities 714, 716 are positioned between portions of the forward-flowing serpentine flow path 702 and the external surface of the airfoil 700 directly exposed to the freestream hot gas path air. For example, the first and second shielding cavities 714, 716 can be positioned between portions of the forward-flowing serpentine flow path 702 and a pressure side of the airfoil 700. Thus, the first and second shielding cavities 714, 716 shield portions of the forward-flowing serpentine flow path 702 from high pressure side static pressures. As such, the forward-flowing serpentine flow path 702 may be arranged without impacts from outflow margins and/or backflow margins. Although only two pressure side skin core cooling cavities are shown in and discussed within the embodiments of the present disclosure, it is understood by those skilled in the art that this is not limiting in that any number of pressure and/or suction side skin cooling cavity core channels may be utilized as shielding cavities, depending on heat load, cooling mass flow, aerodynamic geometry, and durability life requirements.

Embodiments of the present disclosure, such as shown in FIGS. 7A-7B, allow for dedicated air for high heat flux areas that are challenged thermally (e.g., hybrid trailing edge cavity 732). By having dedicated air in high heat load regions the cooling circuit can be optimized because the coldest air is being utilized to maximize both the backside convective cooling as well as reduce the local external film cooling temperature. In so doing, the highest local thermal cooling effectiveness using the least amount of cooling mass flow can be achieved. As a result, significant improvements in turbine aerodynamic performance, oxidation life, and Thermal Mechanical Fatigue (TMF) capability can be achieved. Such design optimization can yield a reduction in total airfoil cooling flow and supply pressure requirements, thereby minimizing parasitic leakage air which inherently produces large momentum mixing losses and decreases turbine stage and component efficiency resulting in increases in fuel burn and Total Specific Fuel Consumption (TSFC).

Further, as shown in the embodiment of FIGS. 7A-7B, the hybrid trailing edge cooling cavity is connected to a forward-flowing serpentine. Normally such arrangement cannot be executed in current engine designs due to the reduced supply pressure of current airfoil design in order to minimize leakage flow which adversely impacts both turbine stage efficiency and turbine module performance. As a result of the low blade supply pressure ratio and reduced supply pressure may give rise to low outflow margin and/or backflow margin issues associated with the high external gas path static pressure present along the external pressure side surface of the airfoil. The issues associated with outflow margins and/or backflow margins is alleviated by strategically incorporating pressure side hybrid skin core cooling cavities. Additionally, the pressure side sink core cooling cavities provide shielding of the forward-flowing serpentine cooling passages. The reduction in cooling air temperature enables the maximum differential possible between the local external driving gas/film temperature and the internal cooling air temperature. By maximizing the local temperature differential between the external driving gas/film temperature and the internal cooling air temperature, the local cooling effectiveness, and thermal performance proximate the blade tip airfoil region can be significantly increased. In turn, the improvement in blade airfoil tip oxidation and TMF durability capability enables the retention of reduced blade tip running clearances, thus significantly increasing turbine component efficiency over the life cycle of engine operation.

Moreover, having the forward-flowing serpentine connected to the trailing edge cavity eliminates any "dead zones," i.e. regions of low internal coolant velocities, separated and/or recirculating flow regions within the cooling circuit channels, etc. that result in poor backside convective cooling flow characteristics producing low local thermal cooling effectiveness and thermal performance. Typically cooling cavities that terminate within the airfoil exhibit a region of low internal velocity, Reynolds number, and convective heat transfer that naturally exists at the end of a "dead ended" cooling passage, similar to the trailing edge feed cavity 514 shown in FIG. 5. In this instance the reduction in local backside convective heat transfer is drastically reduced and therefore results in poor thermal cooling effectiveness characteristics, increased metal temperature, and reduced durability capability resulting in premature oxidation erosion of local metal. To address this adverse flow condition it is often necessary to add additional cooling flow locally through incorporation of local film cooling. Although incorporating local film cooling activates the internal cooling flow locally and reduces local external heat flux by providing a protective film boundary, it comes at the expense of increase cooling flow requirements which adversely impacts turbine efficiency as well as increases momentum mixing losses that occur between high velocity external gas path flow and the lower velocity film cooling flow being ejected into the freestream.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, the airfoil comprising:
    an airfoil body having a leading edge and a trailing edge, a root region and a tip region, wherein an aftward direction is from the leading edge toward the trailing edge and a radially outward direction is from the root region to the tip region;
    a forward-flowing serpentine flow path formed within the airfoil body, the forward-flowing serpentine flow path defined by a first serpentine cavity, a second serpentine cavity, and a third serpentine cavity, wherein the first serpentine cavity is aftward of the second serpentine cavity, and the second serpentine cavity is aftward of the third serpentine cavity;

a flag tip cavity extending aftward from proximate the leading edge to the trailing edge along the tip region of the airfoil body;

a hybrid trailing edge cavity, wherein the first serpentine cavity is part of the hybrid trailing edge cavity; and at least two shielding cavities located on a pressure side of the airfoil body between a portion of the forward-flowing serpentine flow path and an external surface along the pressure side of the airfoil body, wherein the at least two shielding cavities are fluidly separate from the forward-flowing serpentine flow path and fluidly separate from each other within the airfoil body, wherein a cooling air flow is supplied into the forward-flowing serpentine flow path from a hybrid trailing edge feed cavity inlet at the hybrid trailing edge cavity, and the cooling air flow passes through the first serpentine cavity, the second serpentine cavity, the third serpentine cavity, into and through the flag tip cavity, and exits through the trailing edge of the airfoil body, and wherein a portion of the cooling air flow exits the hybrid trailing edge cavity at the trailing edge of the airfoil body.

2. The airfoil of claim 1, wherein the hybrid trailing edge cavity comprises one or more heat transfer augmentation features.

3. The airfoil of claim 1, wherein the tip flag cavity comprises one or more heat transfer augmentation features.

4. The airfoil of claim 1, wherein the at least two shielding cavities comprise a first shielding cavity and a second shielding cavity.

5. The airfoil of claim 1, wherein each shielding cavity extends radially through the airfoil body from the root region to the tip region.

6. The airfoil of claim 1, further comprising a radially extending partitioning rib extending radially and separating the hybrid trailing edge cavity from the second serpentine cavity, wherein the hybrid trailing edge cavity is fluidly connected to the second serpentine cavity at a radially outward end of the radially extending partitioning rib.

7. The airfoil of claim 6, further comprising a resupply connection fluidly connecting the hybrid trailing edge cavity to the second serpentine cavity at a radially inward end of the radially extending partitioning rib.

8. The airfoil of claim 1, further comprising a platform wherein the root region of the airfoil body is integral with the platform.

9. The airfoil of claim 8, wherein the hybrid trailing edge feed cavity inlet supplies serpentine cooling air through the platform and into the airfoil body.

10. A gas turbine engine comprising:
a turbine section comprising a plurality of airfoils, wherein at least one airfoil comprises:
an airfoil body having a leading edge and a trailing edge, a root region and a tip region, wherein an aftward direction is from the leading edge toward the trailing edge and a radially outward direction is from the root region to the tip region;

a forward-flowing serpentine flow path formed within the airfoil body, the forward-flowing serpentine flow path defined by a first serpentine cavity, a second serpentine cavity, and a third serpentine cavity, wherein the first serpentine cavity is aftward of the second serpentine cavity, and the second serpentine cavity is aftward of the third serpentine cavity;

a flag tip cavity extending aftward from proximate the leading edge to the trailing edge along the tip region of the airfoil body;

a hybrid trailing edge cavity, wherein the first serpentine cavity is part of the hybrid trailing edge cavity; and at least two shielding cavities located on a pressure side of the airfoil body between a portion of the forward-flowing serpentine flow path and an external surface along the pressure side of the airfoil body, wherein the at least two shielding cavities are fluidly separate from the forward-flowing serpentine flow path and fluidly separate from each other within the airfoil body, wherein a cooling air flow is supplied into the forward-flowing serpentine flow path from a hybrid trailing edge feed cavity inlet at the hybrid trailing edge cavity, and the cooling air flow passes through the first serpentine cavity, the second serpentine cavity, the third serpentine cavity, into and through the flag tip cavity, and exits through the trailing edge of the airfoil body, and wherein a portion of the cooling air flow exits the hybrid trailing edge cavity at the trailing edge of the airfoil body.

11. The gas turbine engine of claim 10, wherein at least one of the hybrid trailing edge cavity and the tip flag cavity includes one or more heat transfer augmentation features.

12. The gas turbine engine of claim 10, wherein the at least two shielding cavities comprise a first shielding cavity and a second shielding.

13. The gas turbine engine of claim 10, wherein each shielding cavity extends radially through the airfoil body from the root region to the tip region.

14. The gas turbine engine of claim 10, the airfoil body further comprising a radially extending partitioning rib extending radially and separating the hybrid trailing edge cavity from the second serpentine cavity, wherein the hybrid trailing edge cavity is fluidly connected to the second serpentine cavity at a radially outward end of the radially extending partitioning rib.

15. The gas turbine engine of claim 14, the airfoil body further comprising a resupply connection fluidly connecting the hybrid trailing edge cavity to the second serpentine cavity at a radially inward end of the radially extending partitioning rib.

16. The gas turbine engine of claim 10, further comprising a platform wherein the root region of the airfoil body is integral with the platform.

* * * * *